(12) United States Patent  (10) Patent No.: US 7,590,225 B2
Sivula  (45) Date of Patent: Sep. 15, 2009

(54) METHOD FOR ADDRESSING BILLING IN A MESSAGE SERVICE, MESSAGING SERVICE SYSTEM, SERVER AND TERMINAL

(75) Inventor: Timo Sivula, Espoo (FI)

(73) Assignee: Nokia Corporation, Espoo (FI)

( * ) Notice: Subject to any disclaimer, the term of this patent is extended or adjusted under 35 U.S.C. 154(b) by 471 days.

(21) Appl. No.: 09/882,756

(22) Filed: Jun. 15, 2001

(65) Prior Publication Data

US 2001/0053687 A1 Dec. 20, 2001

(30) Foreign Application Priority Data

Jun. 16, 2000 (FI) ................................. 20001437

(51) Int. Cl.
*H04M 11/00* (2006.01)
(52) U.S. Cl. .............. 379/88.13; 379/88.12; 379/88.22; 379/88.25; 379/144.07; 379/374.02; 455/412.2; 340/7.5; 709/206
(58) Field of Classification Search ................ 455/412, 455/406, 466, 417, 412.1–413, 432.2, 507, 455/403, 415, 412.2; 340/7.23, 7.5; 377/88.11–88.12, 377/88.22, 88.25, 144.01, 211.02; 713/200; 709/206, 227; 379/114.26, 144.02, 121.01, 379/88.18, 88.22–88.28, 114.01, 88.13, 88.14, 379/48, 72, 76, 144.07, 144.08, 167.08, 263, 379/373.04, 374.01, 374.02; 370/401, 254, 370/486; 705/14, 79; 715/717
See application file for complete search history.

(56) References Cited

U.S. PATENT DOCUMENTS

| 5,381,467 | A | * | 1/1995 | Rosinski et al. | ........ 379/121.01 |
|---|---|---|---|---|---|
| 5,448,625 | A | * | 9/1995 | Lederman | ................ 379/88.25 |
| 5,623,538 | A | * | 4/1997 | Petty | ...................... 379/88.13 |
| 5,742,668 | A | * | 4/1998 | Pepe et al. | ................... 455/415 |
| 5,751,791 | A | * | 5/1998 | Chen et al. | ............... 379/88.13 |
| 5,751,794 | A |   | 5/1998 | Kugell et al. | .................. 379/89 |
| 5,859,967 | A | * | 1/1999 | Kaufeld et al. | .............. 713/200 |
| 5,959,543 | A | * | 9/1999 | LaPorta et al. | ............. 340/7.23 |
| 6,188,887 | B1 | * | 2/2001 | Joong et al. | ................. 455/417 |
| 6,246,871 | B1 | * | 6/2001 | Ala-Laurila | ................. 455/413 |
| 6,246,883 | B1 | * | 6/2001 | Lee | ........................... 455/507 |

(Continued)

FOREIGN PATENT DOCUMENTS

WO WO 99/27724 6/1999

*Primary Examiner*—Md S Elahee
(74) *Attorney, Agent, or Firm*—Perman & Green LLP

(57) ABSTRACT

The invention relates to a method for addressing billing in a multimedia messaging service (MMS) utilizing store-and-automatic forward transmission, in which method the message addressed to a B-subscriber is transmitted from a terminal (TA) of an A-subscriber to a server (MMSC) of the multimedia messaging service system, the arrival of said message to the server (MMSC) is reported to a wireless terminal (MSB) of the B-subscriber, and in which method said message is transmitted from the server (MMSC) further to the wireless terminal (MSB) of the B-subscriber. According to the invention, the message addressed to the B-subscriber is retrieved to the wireless terminal (MSB) of the B-subscriber from the server (MMSC) by establishing a substantially toll-free data transmission connection between wireless terminal (MSB) of the B-subscriber and the server (MMSC), said data transmission connection being opened by the terminal (MSB) of the B-subscriber. The invention also relates to a multimedia messaging service system (MMS), a server (MMSC) for a multimedia messaging service system, and a wtireless terminal (MS).

20 Claims, 4 Drawing Sheets

U.S. PATENT DOCUMENTS

Figure 1:
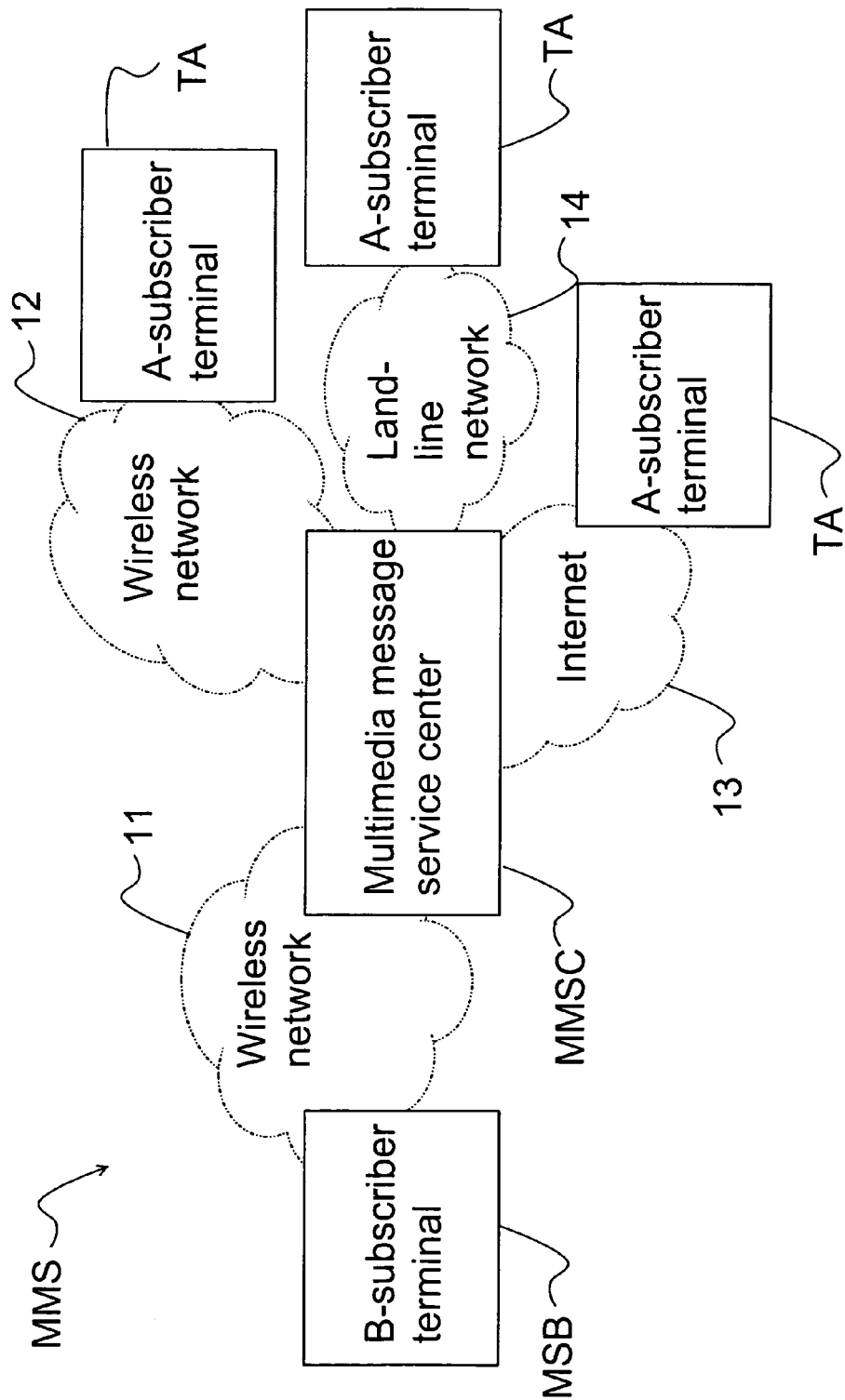

| | | | |
|---|---|---|---|
| 6,269,158 B1 * | 7/2001 | Kim .................. 379/144.01 |
| 6,333,919 B2 * | 12/2001 | Gaffney .................. 370/254 |
| 6,333,973 B1 * | 12/2001 | Smith et al. .............. 379/88.12 |
| 6,385,202 B1 * | 5/2002 | Katseff et al. .............. 370/401 |
| 6,418,202 B1 * | 7/2002 | Caldwell et al. .......... 379/88.25 |
| 6,421,707 B1 * | 7/2002 | Miller et al. ................ 709/206 |
| 6,463,137 B1 * | 10/2002 | Vanjani et al. ......... 379/114.26 |
| 6,470,181 B1 * | 10/2002 | Maxwell ...................... 455/413 |
| 6,640,242 B1 * | 10/2003 | O'Neal et al. ............... 709/206 |
| 6,690,785 B1 * | 2/2004 | Stelter et al. ........... 379/211.02 |
| 6,886,030 B1 * | 4/2005 | Easterbrook et al. ........ 709/206 |
| 2001/0017914 A1 * | 8/2001 | Fortman .................. 379/88.14 |
| 2001/0032193 A1 * | 10/2001 | Ferber ......................... 705/79 |
| 2001/0037240 A1 * | 11/2001 | Marks et al. .................. 705/14 |

* cited by examiner

METHOD FOR ADDRESSING BILLING IN A MESSAGE SERVICE, MESSAGING SERVICE SYSTEM, SERVER AND TERMINAL

The present invention relates to addressing billing in a multimedia messaging service applying store-and-automatic messaging.

At present, wireless communication networks and the use of the same expand rapidly. The developing wireless communication technology also enables the introduction of new operating modes to accompany conventional communication based on speech transmission. By means of the digital portable communication devices which are currently in use and typically today represent the so-called second generation, it is already possible to transmit e.g. text-based so-called SMS short messages SMS (Short Message Service). So-called multimedia communication devices or phones will also in the near future provide even more extensive possibilities for the transmission of other kinds of messages M in wireless communication networks. Development seems to be moving towards the introduction of even more developed functions similar e.g. to Internet services, to the digital wireless terminals MS of wireless communication networks.

The aforementioned new operating modes of the wireless communication networks become feasible e.g. by means of WAP technology which is currently under development. WAP (Wireless Application Protocol) is an open standard which is designed to support globally the majority of second generation digital wireless communication networks, such as for example GSM (Global System for Mobile Communications), GPRS (General Packet Radio Service), PDC (Personal Digital Cellular), CDMA IS-95 (Code Division Multiple Access), TDMA IS-136 (Time Division Multiple Access) and third generation networks such as WCDMA (Wideband CDMA) and CDMA-2000.

In third generation wireless systems, of which a term UMTS (Universal Mobile Telecommunication System) is generally used, the data transmission rates are considerably increased when compared to second generation systems, thereby better enabling for example the transmission of messages M containing images or video clips to wireless terminals MS.

The concept of multimedia messaging service MMS refers to a message transmission system used in wireless communication networks, the properties of which system have been determined for example by the association of WAP Forum and 3GPP ($3^{rd}$ Generation Partnership Program).

Because some of the above-described systems, including e.g. the WAP system, have been developed only recently, and because the specifications of these systems often merely determine the framework for different implementations, there are no known solutions for implementing certain functions in these systems.

The present invention relates to the transmission of messages M in a situation where the message M is transmitted from the sender to the receiver by means of so-called store-and-automatic forward messaging via a server of the multimedia messaging service system MMS, i.e. via a multimedia message service center MMSC. This transmission method and system are described in more detail hereinbelow. In conventional telephone communication, as well as in telephone communication implemented with wireless connections, with the exception of North America, the basic principle is that the party requesting the connection, i.e. the caller, a so-called A-subscriber, is primarily responsible for the expenses caused by the connection. For the receiver of the call, a so-called B-subscriber, the connection does not normally cause any costs. In mobile phones, a known exception is a situation, where the phone of the B-subscriber is located abroad with respect to its registration country, wherein when the B-subscriber answers the call; s/he consciously becomes responsible for that part of the cost of the call which is caused by the transmission of the call outside said registration country. This makes it possible that the A-subscriber, who cannot always be assumed to be aware of the geographical location of the B-subscriber beforehand, can, however, be aware of the billing principles of the call that s/he has made and thereby of the costs of the call to be invoiced. On the other hand, when the B-subscriber receives such a call, s/he can always make a choice whether s/he wants to answer the call of the A-subscriber and thereby become responsible for a part of the expenses caused by the connection.

The same basic principle for billing, in which the party requesting the connection, i.e. the A-subscriber, is primarily responsible for the costs caused by the connection, is in addition to telephone communication, also valid in the transmission of messages M in wireless communication networks.

According to the present invention, the multimedia messaging service MMS comprises apparatuses and procedures for the transmission of messages M from the A-subscriber to the wireless terminal MSB (Mobile Station B) of the B-subscriber, from the A-subscriber to the Internet network, or from the Internet network to the wireless terminal MSB of the B-subscriber. The wireless terminal MSB of the B-subscriber can be for example a so-called multimedia phone, or a corresponding portable terminal, which, in addition to mobile communication properties, can also contain data processing properties. The terminal TA (Terminal A) of the A-subscriber can be a wireless terminal corresponding to the terminal of the B-subscriber, but in addition to that, also another digital terminal connected to the multimedia message service center MMSC via a landline network, such as the Internet network. In view of the present invention, the essential aspect is that at least the terminal MSB of the B-subscriber is a wireless terminal.

In terms of the present embodiments, the multimedia messaging service MMS in the wireless communication networks is based on store-and-automatic forward messaging. In store-and-automatic forward messaging the message M transmitted by the A-subscriber is first transmitted to a server, to a multimedia message service center MMSC to which it is temporarily stored, and transmitted forward therefrom to the wireless terminal MSB of the B-subscriber as soon as it is possible to reach said terminal, i.e. often almost immediately.

According to the basic principles of the multimedia messaging service MMS, the transfer of the message M from the multimedia message service center MMSC to the terminal MSB of the B-subscriber should take place automatically without actions required from the B-subscriber. A corresponding principle is used for example in the transmission of aforementioned SMS short messages. Text-based SMS short messages are transmitted by means of store-and-forward messaging and by means of so-called connectionless connection service from the short message service center SMSC to the terminal MSB of the receiving B-subscriber, without a separate message-specific approval or another active action by the B-subscriber. The aforementioned message transmission method is known as pushing. In this case, the sender of the message, the A-subscriber, is responsible for the expenses caused by the transmission of the message.

So far, the transmission of the message M by pushing and by means of the connectionless connection service has not been specified in detail for example in the WAP system. For third generation mobile communication networks, such as WCDMA, a multimedia messaging service MMS has been suggested, which would be implemented substantially in a corresponding manner as the short message service SMS, i.e. substantially by pushing the messages M stored to a particular message service center MMSC and addressed to the wireless terminal MSB of the B-subscriber to said terminal MSB as soon as it can be reached.

In a multimedia messaging service MMS, which is under development for wireless communication networks, an alternative way has been suggested for the transmission of messages M from the multimedia message service center MMSC to the terminal MSB of the B-subscriber by using a connection oriented connection service instead of the connectionless connection service. This procedure is described in more detail hereinbelow.

When a message M transmitted by the A-subscriber is first transferred to the multimedia message service center MMSC, a short notification message is first transmitted from said multimedia message service center to the terminal MSB of the B-subscriber as an indication that the message M that has arrived to the said center. On the basis of the aforementioned indication, the terminal MSB of the B-subscriber automatically opens a connection-oriented connection to the multimedia message service center MMSC in order to retrieve the message M. This can take place, for example, in such a manner that the terminal of the B-subscriber calls to a dialup modem located in the multimedia message service center MMSC, thus retrieving the actual message M to the terminal MSB of the B-subscriber.

In the above-described method using the connection-oriented connection for the retrieval of the message M, a significant problem is, however, that because the terminal MSB of the B-subscriber at the retrieval situation acts as an opener of the connection, in other words in a similar manner as the A-subscriber in view of opening the connection-oriented connection, this action results in that the B-subscriber is invoiced for the connection costs caused by the retrieval of the message M. In such a situation, basically anyone can cause expenses for the B-subscriber, by arbitrarily transmitting messages M to him/her.

One purpose of the present invention is to produce a method to be used in a multimedia messaging service MMS, which method eliminates the above-described billing problem in a situation in which the terminal MSB of the B-subscriber functions as an opener of a connection-oriented connection in order to retrieve a message M addressed to the B-subscriber automatically from a server of the multimedia messaging service system MMS, from the multimedia message service center MMSC. Furthermore, it is an aim of the invention to attain a multimedia messaging service system MMS which implements the aforementioned method, a server MMSC of said service system and a wireless terminal MS used in said service system.

To attain this purpose, the method according to the invention is primarily characterized in what will be presented in the characterizing part of the independent claim 1.

The multimedia messaging service system MMS according to the invention is primarily characterized in what will be presented in the characterizing part of the independent claim 8.

The server MMSC according to the invention for a multimedia messaging service system is primarily characterized in what will be presented in the characterizing part of the independent claim 9.

The wireless terminal MS according to the invention to be used in the multimedia messaging service system is primarily characterized in what will be presented in the characterizing part of the appended claim 17.

The other dependent claims present some preferred embodiments of the invention.

The invention is based on the idea that in the server of the multimedia messaging service system, in the multimedia message service center MMSC, or in connection with said server there are connection means available for the establishment of a connection-oriented connection, which is toll-free for the subscriber functioning as the opener of the said connection, for example, a dialup modem operating in a toll-free number. In order to retrieve a message M addressed to the B-subscriber, the terminal MSB of the B-subscriber establishes a connection to the server MMSC by means of said connection means, which means that the retrieval of the message M to the terminal MSB of the B-subscriber can be started automatically on the basis of a short notification message indicating an incoming message, so that no connection costs are caused for the B-subscriber of the retrieval of the message.

In an advantageous embodiment of the invention, the arrival of a message M addressed to a certain B-subscriber to the multimedia message service center MMSC is reported to the B-subscriber in question by transmitting a short notification message to the terminal MSB of the B-subscriber, advantageously by using connectionless connection service. Such a notification message can be for example a SMS short message, or a corresponding message implemented by means of WAP functions.

In an advantageous embodiment of the invention, the transmission of the message M from the transmitting terminal TA of the A-subscriber to the multimedia message service center MMSC takes place by means of a connection-oriented connection as well, for example by calling a dial-up modem number in the message service center, said number being intended for the transmission of messages M and is subject to charge. Thus, when the A-subscriber functions as an opener of the connection, the A-subscriber can be charged for the transmission of the message, either partly or entirely as a connection cost of said connection-oriented connection.

A considerable advantage of the present invention is that by means of the invention it is possible to implement a multimedia messaging service and system MMS, billing, and a server MMSC by advantageously using existing devices and functions, such as dial-up modems, connection modes and coupling modes by combining them together to form a suitable entity, which is supplemented with and controlled by a suitable program code produced for this purpose. For portable terminals the changes required for the implementation of the method according to the invention can be made easily and economically, simply by changing the program code. With respect to the A- and B-subscriber, the multimedia messaging service MMS according to the invention functions in a corresponding manner as it would if it was implemented exclusively by using a pushing transmission method and connectionless transmission modes. Thus, the invention enables the use of existing technology in a new way thereby increasing the versatility of the services provided in wireless networks. This reduces the economical investments required in the implementation of these services, and the operators and other companies providing these communication services, as well as the end users of said communication services are able to gain advantage thereof.

Figure 2:
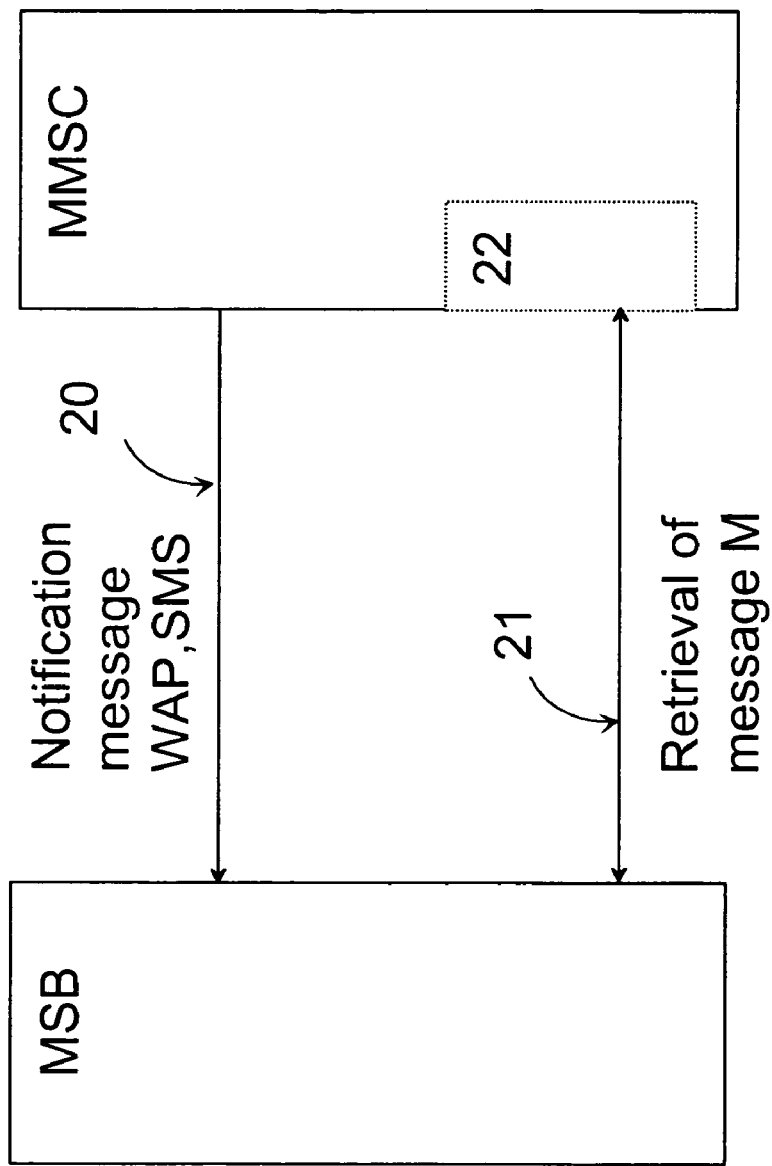
Figure 3:
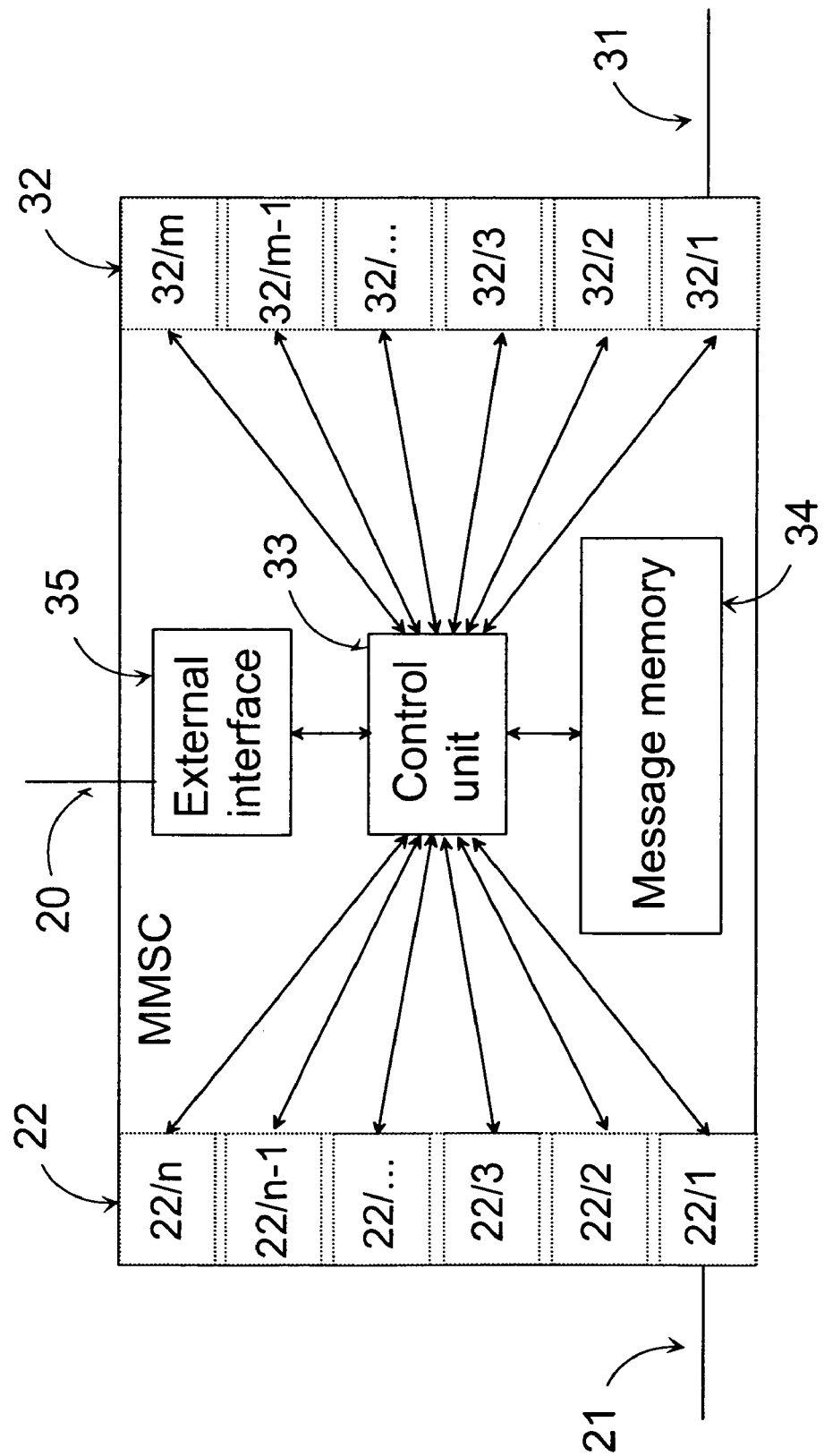
Figure 4:
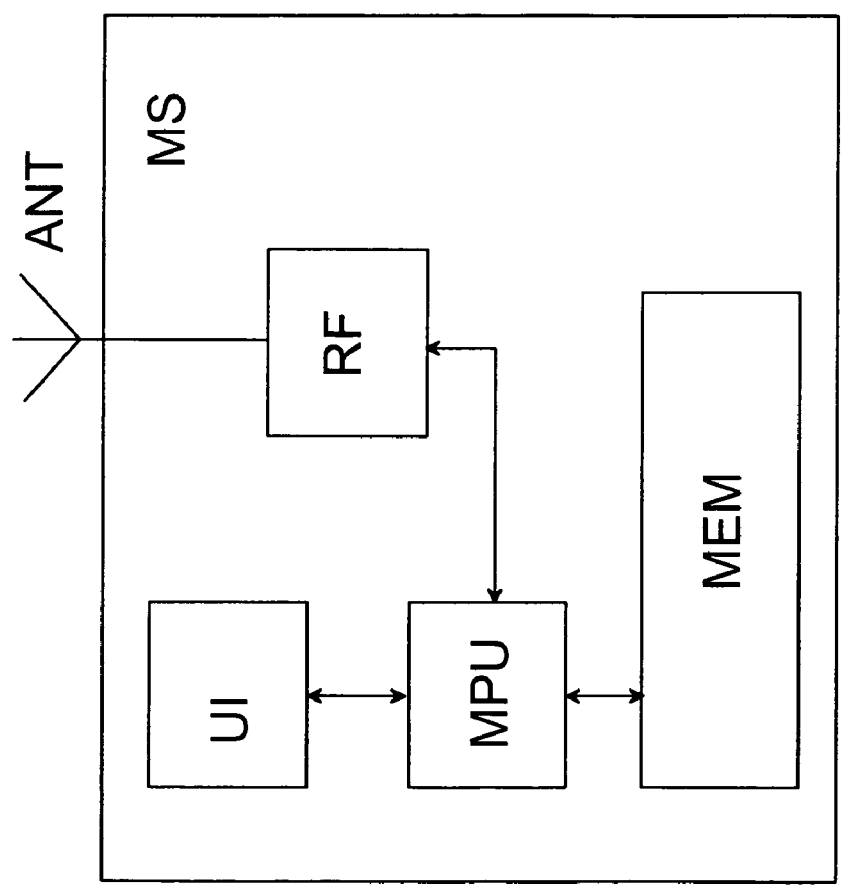

In the following, the invention will be described in more detail with reference to the appended drawings, in which FIG. 1 illustrates an embodiment of the multimedia messaging service MMS according to the invention on a general level, FIG. 2 illustrates the functions between the terminal MSB of the B-subscriber and the multimedia message service center MMSC in the message transmission according to the invention, FIG. 3 is a reduced block diagram showing the central functional blocks of the multimedia message service center MMSC according to the invention, and FIG. 4 shows the essential parts of the wireless terminal MS implementing the method according to the invention.

The multimedia message service center MMSC shown in FIG. 1 is a network element, a server of a multimedia messaging service system, which can be located for example in a so-called cellular network of a wireless communication network, or in the Internet network. In the multimedia messaging service system MMS, the multimedia message service center MMSC functions as a means which stores a message M addressed to the wireless terminal of a B-subscriber temporarily to its memory and transmits the same automatically further to the terminal MSB of the B-subscriber as soon as said terminal can be reached. A situation in which the terminal MSB of the B-subscriber cannot be immediately reached can occur for example when the terminal MSB of the B-subscriber has been switched off, or it has been automatically switched off due to the fact that the battery has run out, or said terminal is temporarily outside the service area of a communication network 11. It is also possible that the function of the multimedia message service center MMSC causes delays in the transmission of the message M, for example in a situation where the operation of the multimedia message service center MMSC has been congested because of a temporary large number of messages. The aforementioned transmission method is known as the store-and-automatic forward messaging method.

To transmit the message M, the terminal TA of a A-subscriber can, according to FIG. 1, be connected to the multimedia message service center MMSC via a wireless communication network 12, via the Internet network 13, via a combination of these two, or by means of another connection mode, for example via a public switched telephone network (PSTN) 14. The terminal TA of the A-subscriber can be for example a so-called multimedia phone, or another portable terminal, or a non-portable terminal, such as a computer connected to the Internet network. The connection between the terminal TA of the A-subscriber and the multimedia message service center MMSC can be implemented by means of a connection-oriented or a connectionless connection mode, and the coupling can be implemented by means of a so-called circuit switched or packet switched coupling mode.

When a message M addressed to the wireless terminal MSB of the B-subscriber has arrived to the multimedia message service center MMSC, said message service center stores the message in its memory and transmits a short notification message 20 to the wireless terminal MSB of the B-subscriber indicating that the message can be retrieved. FIG. 2 illustrates the functions between the terminal MSB of the B-subscriber and the multimedia message service center MMSC in the transmission of the message M to the B-subscriber according to the invention.

According to the invention, the notification message 20 is transmitted to the B-subscriber advantageously by means of a connectionless connection service, which does not require the establishment of a connection between the terminal MSB of the B-subscriber and the multimedia message transmission center MMSC. Such a notification message can be for example a SMS short message, or a corresponding message implemented by means of WAP functions. The notification message 20 can contain contact information on the dial-up modem number from which the message M can be retrieved, as well as for example an individual identification regarding said message. The notification message 20 can also contain other information relating to the incoming message M, such as for example information on the sender of the message (A-subscriber) as well as on the priority, type and size of the message.

When the wireless terminal MSB of the B-subscriber has received said notification message 20, it automatically initiates a set-up of a connection 21 to the multimedia message service center MMSC to retrieve the message. In this context, the term "automatically" denotes that the aforementioned process is conducted without separate message-specific actions being required from the B-subscriber. According to the invention, the automatic retrieval of the message takes place in such a manner that the terminal MSB of the B-subscriber calls to a dial-up modem pool 22 in a toll-free number in the message service center MMSC, the number of the dial-up modem pool being indicated in the notification message 20 that has arrived, or said number is stored in the memory of the terminal MSB beforehand, for example, when the B-subscriber has enabled the reception functions of messages M in its terminal MSB. In the dial-up modem pool 22, there are several separate dial-up modems arranged for the purpose of answering the same phone number so that by means of said dial-up modems it is possible to serve several different B-subscribers at the same time. During connection set-up, the terminal MSB of the B-subscriber and a dial-up modem of the dial-up modem pool 22 can, according to prior art, perform actions to select, for example, a suitable so-called line baud rate and the data transmission protocol used during the connection 21. In the data transmission between the terminal MSB of the B-subscriber and the dial-up modem located in the multimedia message service center MMSC, it is possible to use, for example, data compression techniques in a known manner to minimize the amount of data to be transmitted in the actual modem line during the connection 21.

When the terminal MSB of the B-subscriber has managed to open a connection 21 to a free dial-up modem in the dial-up modem pool 22, the multimedia message service center MMSC transmits the message/messages M which are temporarily stored in said center and intended for the B-subscriber, to the terminal MSB of the B-subscriber.

The multimedia message transmission center MMSC can identify the messages intended for the B-subscriber on the basis of the fact that in the beginning of the connection 21, the terminal MSB of the B-subscriber first transmits its own identification information characteristic to the B-subscriber, such as a telephone number, to the message service center MMSC, or alternatively, the identification can take place by means of the aforementioned message-specific identification, which said identification is transmitted with a notification message 20 indicating the incoming message M, to the terminal MSB of the B-subscriber, and it is transmitted back to the multimedia message service center MMSC by the terminal MSB in the beginning of the connection 21.

A preferred embodiment of the multimedia message service center MMSC implementing the method according to the invention is shown as a reduced block diagram in FIG. 3. In the following, the invention will be described in more detail with reference to FIG. 3.

To implement the method according to the invention, the multimedia message service center MMSC is advantageously provided with two separate dial-up modem pools in such a way that the first dial-up modem pool 22 is intended to serve the terminals MSB of the B-subscribers in the above-described manner when said terminals retrieve messages M from the message service center MMSC. The second dial-up modem pool 32, in turn, is intended for the reception of messages M to be transmitted to the message service center MMSC, in other words, to serve the terminals TA of the A-subscribers. The number of said second dial-up modem pool 32 can be a number which is subject to charge, wherein the A-subscriber who transmits the message M, is automatically charged in his/her phone bill, and thus, it is not necessary for the A-subscriber to make a separate contract with the operator in charge of the multimedia messaging service MMS for the transmission of messages M. The price the A-subscriber is charged for the transmission of the message M can be based for example to a time-based charge according to the length/size of the message M to be transmitted. It is also possible that the number of the dial-up modem pool 32 is a toll-free number, and that a separate contract with the operator in charge of the service is required from the A-subscriber so that the multimedia messaging service MMS can be used. Thus, the invoicing of the A-subscriber can be taken care of separately according to details set in the aforementioned contract. Furthermore, it is also possible that when the A-subscriber transmits a message M addressed to the B-subscriber to the multimedia message service center MMSC, the A-subscriber is at this stage only partly charged for the costs incurred from the transmission of the message, and the final charging does not take place until the B-subscriber has retrieved the message M from the multimedia message service center MMSC. Alternatively, the entire charging process of the A-subscriber can take place after the message has been transmitted to the terminal MSB of the B-subscriber.

To implement the method according to the invention, the number of said first dial-up modem pool 22 is a toll-free number.

In view of the present invention, the message M transmitted by the A-subscriber is transferred to the multimedia message service center MMSC advantageously by means of a wireless communication network 12 (see FIG. 1) in such a manner that the terminal TA, such as a multimedia phone of the A-subscriber, calls to a dial-up modem in the dial-up modem pool 32 in the multimedia message service center MMSC, and establishes a connection-oriented connection to transmit the message M to the message service center MMSC.

In the multimedia message service center MMSC the message M arriving from the A-subscriber under the control of a control unit 33 is temporarily stored in a data storage, i.e. to a message memory 34. The message memory 34 is advantageously established in the memory area defined in the memory of the multimedia message service center MMSC, which area can be either fixed in size or its length can vary according to the use requirements at a given time.

In a situation where the multimedia message service center MMSC receives the message M from the A-subscriber, the message service center examines the address information of the message to find out to which wireless terminal MSB the message in question is addressed. The address information can be for example a phone number, an IP address or URL (Uniform Resource Locator). After the terminal MSB receiving the message has been determined, the multimedia message service center MMSC transmits a notification message 20 to the wireless terminal MSB. The notification message 20 is transmitted to the terminal MSB of the B-subscriber advantageously by means of a connectionless connection service. Such a notification message can be for example a SMS short message, or a corresponding message implemented by means of WAP functions, which message is transmitted out of the multimedia message service center MMSC by means of an external interface 35.

The notification message 20 can contain contact information intended for the terminal MSB of the B-subscriber, indicating the dial-up modem number from which the message M can be retrieved, as well as the individual identification of said message and/or other information relating to the message M to be transmitted. Advantageously, the notification message 20 contains information relating to the incoming message M in a form which can be interpreted by the receiver, for example the URL of the incoming message.

When the terminal MSB of the B-subscriber establishes a connection 21 to a free dial-up modem in the dial-up modem pool 22 as a result of automatic processes initiated by the notification message 20 in said terminal, the multimedia message service center MMSC transmits the message/messages M which is/are temporarily stored in the message memory 34, to the terminal MSB of the B-subscriber. The multimedia message service center MMSC can identify the messages addressed to the B-subscriber from the messages stored in the message memory 34 on the basis of the fact that in the beginning of the connection the terminal MSB of the B-subscriber first transmits its own identification information characteristic to the B-subscriber, such as for example a phone number for the message service center MMSC, or, alternatively, the identification can take place by means of the aforementioned message-specific identification, which said identification is transmitted in the notification message 20 indicating the incoming message M from the multimedia message service center MMSC to the terminal MSB of the B-subscriber, said identification being transmitted back to the multimedia message service center MMSC by the terminal 21 in the beginning of the connection. The identification can also take place for example in such a manner that the URL of the incoming message is transmitted to the terminal MSB of the B-subscriber in the notification message, and as a part of said URL, also a message-specific password, for example in the format http.//www.mmscabcdefg.net/password/message.html.

FIG. 3 shows in a reduced manner only the essential functional blocks which are necessary in the multimedia message service center MSC implementing the method according to the invention. It is, of course, obvious that in addition to the functional blocks shown in FIG. 3, the multimedia message service center MMSC can also contain other functional blocks such as external interfaces and/or gateways to other multimedia message service centers MMSC, short message service centers SMSC, e-mail servers, to the Internet-network or to landline and/or wireless communication networks. The multimedia message service center MMSC can also contain several data storages in addition to the message memory 34. The storing of data in these data storages can be of temporary nature or more permanent. In addition, the multimedia message service center MMSC typically comprises some blocks related to the authentication and maintenance of the multimedia message service center MMSC, which blocks are not, however, shown in the appended FIG. 3 for the sake of clarity. Furthermore, in the dial-up modem pools 22 and 32 of the media message service center MMSC, the number of dial-up modems can be the same in both of them (in FIG. 3 n=m), or the number of dial-up modems can be different (in FIG. 3 n≠m) in each of them according to the selection made by the operator in charge of the service, depending for example on the number of users of the service MMS and on degree of utilization of the said service. It is also possible that the multimedia message service center MMSC does not include a dialup modem pool 32 at all, but the messages transmitted by the A-subscribers are received to the multimedia message service center MMSC in another manner, for example, by utilizing the Internet network. When the A-subscriber transmits the message M to a particular multimedia message service center MMSC, said message can be transmitted forward via one or more other multimedia message service centers MMSC, before it is finally transmitted to the B-subscriber.

Furthermore, FIG. 4 illustrates the parts essential for the function of a wireless terminal MS applying the method according to the invention. The wireless terminal MS, which can function both as the terminal MSB of the B-subscriber and the terminal TA of the A-subscriber, comprises a processor MPU and parts connected substantially to the processor: a memory MEM, a user interface UI and a radio part RF. The processor MPU is advantageously a microprocessor, a microcontroller or a digital signal processing unit (DSP, Digital Signal Processor). The memory MEM advantageously comprises a non-volatile memory (ROM, read only memory) and a random access memory (RAM). The radio part RF can transmit and receive radio frequency signals via an antenna ANT. The user interface UI advantageously provides the user with a display and keyboard so that it is possible to use the wireless terminal MS. The terminal MS is capable of receiving and transmitting SMS messages and/or messages according to the WAP protocol, and communicating with a dial-up modem (e.g. a dial-up modem 22/1 in FIG. 3) in a connection-oriented connection to receive and transmit messages M to be transmitted by means of radio frequency signals.

The software of the wireless terminal MS, as well as the software of said terminal related to the implementation of the multimedia messaging service MMS, are typically stored in the non-volatile read only memory. The processor MPU controls the function of the wireless terminal MS, such as the use of the radio part RF, the presentation of the messages in the user interface UI and the reading of the inputs received from the user interface UI. The software, which can be implemented in a number of different ways, advantageously comprises program blocks which are responsible for the implementation of various procedures. These procedures include for example the operations related to the processing of different components included in the messages and/or to the act of displaying the same to the user, as well as procedures related to the reception of the messages, such as procedures automatically initiated by the arrival of the notification message 20 to retrieve the message M from the multimedia message service center MMSC. In the wireless terminal MS, the multimedia messaging service MMS is implemented by the processor MPU together with the software and memory MEM of the wireless terminal.

The random access memory is used as a temporary buffer memory by the processor MPU in the act of processing information. The software of the wireless terminal MS includes functions by means of which the B-subscriber can enable or disable the procedures automatically initiated by the arrival of the aforementioned notification message 20 to retrieve the message M from the multimedia message service center MMSC. Automatic retrieval of the messages can be enabled or disabled either generally for all messages M, or said function can be restricted to messages M of certain type. The aforementioned properties of the message M to be used as selection criterion can include for example the components contained in the message, for example video clips are not received, whereas audio clips are received. Correspondingly, the identification of the sender of the message M can also be used as selection criterion.

The functions required by the wireless terminal MS of the present invention can be implemented by means of a software by making the necessary changes to the aforementioned program code in the wireless terminal MS.

The multimedia message service center MMSC according to the invention can be implemented by utilizing existing devices and functions, such as dial-up modems, connection modes and coupling modes of the connection by combining them in a suitable manner to an entity functioning in connection with the control unit 33, which entity is supplemented and controlled by means of a suitable program code provided for this purpose.

It is obvious that the present invention is not restricted solely to the embodiments presented above, but it can be freely modified within the scope of the appended claims.

The terminal MSB of the B-subscriber can be for example a multimedia phone or a laptop computer, a desktop computer or a hand-held so-called PDA device (Personal Data Assistant). A concrete example of the wireless terminal MSB of the B-subscriber which contains both mobile communication properties as well as data processing properties at the same time, is the Nokia 9110 Communicator. The aforementioned device can, of course, function as the terminal TA of the A-subscriber. It is also possible that when the message M has been retrieved in the manner according to the invention from the multimedia message service center MMSC for example to a desktop computer, said message M is loaded further to a portable device (organizer), such as a PDA device, of which a concrete example is provided by a Palm Pilot® device. Said loading can be implemented by using a short distance wireless data transmission connection between the PDA device and the desktop computer, for example an infrared link or so-called Blue Tooth technology.

In a corresponding manner, a multimedia phone, as well as different kinds of computer devices, such a portable, handheld or actual desktop computers can function as the terminal TA of the A-subscriber. In addition to the wireless data transmission connection, the terminal of the A-subscriber can be connected to the multimedia message service center MMSC by means of different landline data transmission connections. The connection between the terminal TA of the A-subscriber and the multimedia message service center MMSC can also be partly composed of landline and wireless data transmission connections. The terminal TA of the A-subscriber can be for example a home computer, which is connected to a server of the Internet network via a dial-up modem and a landline public switched telephone network, and further to the multimedia message service center MMSC via said Internet connection.

The connection between the wireless terminal MSB of the B-subscriber and the multimedia message service center MMSC can also contain sections of landline data transmission, in such a manner, however, that the final data transmission section to the terminal MSB, in other words the connection between a base station and said terminal MSB is implemented in a wireless manner. The wireless network, to which the terminal MSB of the B-subscriber or the terminal TA of the A-subscriber is connected, can be for example a so-called WLAN (Wireless Local Area Network), or a corresponding wireless local area network used for example in office buildings.

The multimedia message service center MMSC can be either a separate server, or the functions of the same can be located in the same server that contains the functions of a short message service center SMSC.

When the transmission method according to the present invention is used, the messages M to be transmitted can contain different kinds of components, such as video clips, audio clips, images, text or text data. A single message M can be composed of different combinations of these components, wherein the message M can be understood as an entity to which the A-subscriber who has transmitted the message has compiled a presentation composed of aforementioned components, which said presentation is seen in its entity in the format and order intended by the sender of the message M, by the B-subscriber who receives the message, after s/he has received the message and started to browse the same. The message can, however, be composed of only one aforementioned component, which component can contain for example merely text or text data. Furthermore, the message M can contain one or more aforementioned components, the presentation mode or presentation order of which has not been determined by the A-subscriber beforehand, wherein the B-subscriber can examine and/or otherwise process said components in the manner and order s/he desires.

The invention claimed is:

1. A method of transmitting multimedia messages, said method comprising:
   sending a multimedia message from a terminal of a sender to a server of a multimedia messaging system;
   storing the multimedia message in the server;
   transmitting, from the server to a terminal of a receiver, over a first wireless interface disposed in said server, a notification of the multimedia message;
   automatically retrieving in response to said notification the multimedia message from the server by the terminal of the receiver over a second wireless interface disposed in said server and distinct from said first wireless interface without user intervention; and
   charging the sender at least partly for the retrieval of the multimedia message from the server by the terminal of the receiver
   wherein the notification contains at least the contact information of the second wireless interface,
   the notification comprises at least one of a message-specific identification or a message-specific address related to the message, and the terminal of the receiver retrieves the multimedia message from the server using said notification, a part of which identification/address can be a password or the identification can be merely composed of a password.

2. The method according to claim 1, further comprising opening a wireless local area network connection to at least the second wireless interface disposed in the server or adapted to be connected to said server by the terminal of the receiver.

3. The method according to claim 1, further comprising retrieving the multimedia message addressed to the terminal of the receiver by the terminal of the receiver over said second wireless interface by establishing a substantially toll-free data transmission connection between the terminal of the receiver and the server.

4. The method according to claim 1, wherein the notification comprises at least one of information related to the incoming multimedia message about the sender, the priority of the multimedia message, the type of the multimedia message, or the size of the multimedia message.

5. The method according to claim 1, wherein the information contained in the notification is configured to be a format that can be interpreted by the terminal of the receiver.

6. The method according to claim 1, further comprising identifying a multimedia message addressed to the terminal of the receiver from the multimedia messages contained in the message memory by means of identification data characteristic.

7. The method according to claim 1, further comprising identifying a multimedia message addressed to the terminal of the receiver from a group of multimedia messages contained in the message memory by means of a message-specific identification/address.

8. A multimedia messaging service system, the system comprising at least one server, at least one terminal of a sender and at least one terminal of a receiver, the system being configured to:
   send a multimedia message from the at least one terminal of the sender to the at least one server;
   store the multimedia message in the server;
   transmit from the server a notification of the multimedia message to the terminal of the receiver over a first wireless interface disposed in said server;
   automatically retrieve in response to said notification the multimedia message from the server by the terminal of the receiver over a second wireless interface disposed in said server and distinct from said first wireless interface without user intervention; and
   charge the sender at least partly for the retrieval of the multimedia message from the server by the terminal of the receiver,
   wherein the notification contains at least the contact information of the second wireless interface,
   the notification comprises at least one of a message-specific identification or a message-specific address related to the message, and the terminal of the receiver retrieves the multimedia message from the server using said notification, a part of which identification/address can be a password or the identification can be merely composed of a password.

9. A server for a multimedia messaging system, said server configured to:
   receive a multimedia message from a terminal of a sender;
   store said multimedia message;
   transmit a notification of said multimedia message to a terminal of a receiver over a first wireless interface disposed in said server;
   allow the terminal of the receiver to automatically retrieve in response to said notification the multimedia message over a second wireless interface disposed in said server and distinct from said first wireless interface without user intervention; and
   charge the sender at least partly for the retrieval of the multimedia message from the server to the terminal of the receiver,
   wherein the notification contains at least the contact information of the second wireless interface,
   the notification comprises at least one of a message-specific identification or a message-specific address related to the message, and the terminal of the receiver retrieves the multimedia message from the server using said notification, a part of which identification/address can be a password or the identification can be merely composed of a password.

10. The server according to claim 9, wherein the server is configured to allow the receiving terminal to open a wireless local area network connection to at least the second wireless interface arranged in the server or arranged to be connected to said server.

11. The server according to claim 9, wherein the server is configured to allow the retrieval of the multimedia message by the terminal of the receiver over said second wireless interface by establishing a substantially toll-free data transmission connection between the terminal of the receiver and the server.

12. The server according to claim 9, wherein the notification message comprises at least one of information related to the incoming multimedia message about the sender and/or the priority of the multimedia message, the type of the multimedia message, or the size of the multimedia message.

13. The server according to claim 9, wherein the information contained in the notification is configured to be in a format that can be interpreted by the terminal of the receiver.

14. The server according to claim 9, wherein the server is configured to identify a multimedia message addressed to the terminal of the receiver from multimedia messages contained in a message memory by means of identification data characteristic of the terminal of the receiver.

15. The server according to claim 9, wherein the server contains a circuit configured to identify a multimedia message addressed to the terminal of the receiver from a group of multimedia messages contained in the message memory by means of a message-specific identification/address.

16. The server according to claim 9, wherein the server is a multimedia message service center.

17. A wireless terminal for a multimedia messaging service system, said system comprising at least one server and a terminal of a sender, said wireless terminal being configured to:
   receive from the server over a first wireless interface disposed in said server a notification of a multimedia message addressed to the wireless terminal and sent by the terminal of the sender;
   automatically retrieve in response to said notification said multimedia message from the server over a second wireless interface disposed in said server and distinct from said first wireless interface without user intervention, and
   enable at least partially charging the terminal of the sender for the retrieval of the multimedia message,
   wherein the notification contains at least the contact information of the second wireless interface,
   the notification comprises at least one of a message-specific identification or a message-specific address related to the message, and the terminal of the receiver retrieves the multimedia message from the server using said notification, a part of which identification/address can be a password or the identification can be merely composed of a password.

18. The wireless terminal according to claim 17, wherein the wireless terminal is configured to open a wireless local network connection to at least the second wireless interface disposed in the server or adapted to be connected to said server.

19. The wireless terminal according to claim 17, wherein the wireless terminal is configured to retrieve the multimedia message over said second wireless interface by establishing a substantially toll-free data transmission connection between the terminal and the server.

20. The wireless terminal according to claim 17, wherein said first wireless interface comprises a cellular interface and the second wireless interface comprises a WLAN interface.

* * * * *